INVENTOR
Theodor Helmbold 3,144,203
Patented Aug. 11, 1964

3,144,203
TRANSVERSE FLOW TYPE BLOWERS
Theodor Helmbold, Hedwigstrasse 4, Munich 2, Germany
Filed Mar. 20, 1962, Ser. No. 181,135
Claims priority, application Germany Mar. 23, 1961
6 Claims. (Cl. 230—125)

The present invention relates to transverse flow type blowers which incorporate a device arranged within the interior of the blower rotor for stabilizing a cylindrical vortex.

This application is a continuation-in-part of my copending application filed April 5, 1961, and bearing the Serial Number 100,999.

As disclosed in said copending application, a device comprising a trough-shaped fluid guiding body is employed for generating, guiding and stabilizing a fluid vortex in a transverse flow type blower rotor. The present invention provides for a covering member positioned radially between the inwardly directed bladed periphery of the blower rotor and the vortex guiding body to protect relatively large vortices against destruction or disturbance particularly by the blade screen of the rotor. As a result of developing and maintaining relatively large vortices in this manner, an increased delivery efficiency of the blower is obtainable.

It is, accordingly, a primary object of the present invention to provide for a novel device which protects large blower rotor vortices against destruction or disturbance by component parts of the rotor.

A further object of the present invention resides in the provision of a novel transverse flow type blower having a peripherally bladed rotor with a fluid guide body arrangel to generate and stabilize a fluid vortex within the interior of the rotor and a covering member arranged between the guide body and the inwardly directed bladed periphery of the rotor to protect relatively large vortices against destruction and undesirable disturbance by the blower rotor.

Figure 1:
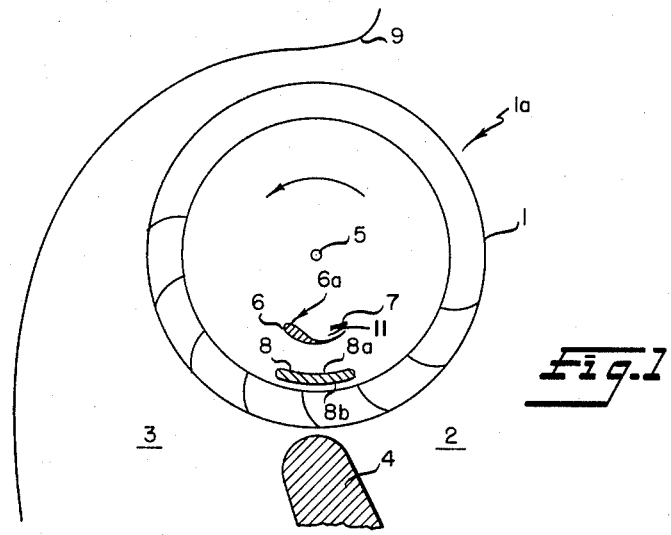
Figure 2:
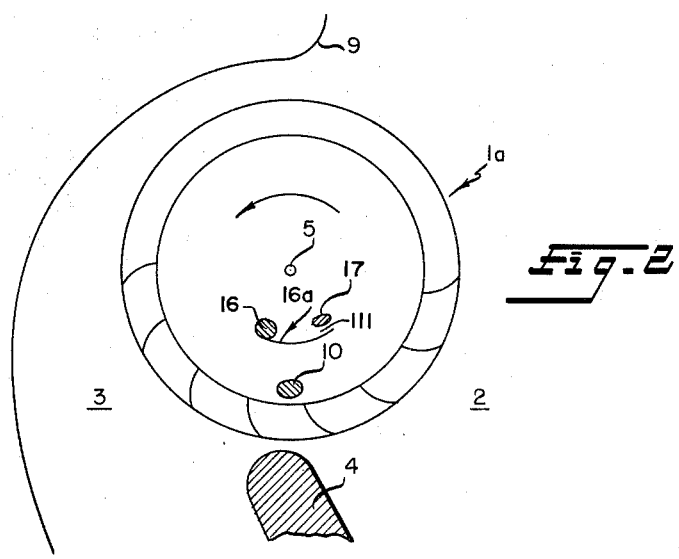

Further objects will appear from the foregoing description and appended claims which read in conjunction with the accompanying drawings wherein:

FIGURE 1 is a diagrammatic cross-sectional view of a transverse flow type blower incorporating one embodiment of the present invention; and FIGURE 2 is a diagrammatic cross-sectional view of a transverse flow type blower incorporating another embodiment of the present invention.

Referring now to the drawings, and more particularly to FIGURE 1, the reference numeral 1a designates a transverse flow type blower as viewed from an axial direction. Blower 1a comprises a peripherally bladed rotor 1 conventionally mounted for rotation about a longitudinal axis indicated by the reference character 5.

With continued reference to FIGURE 1, blower 1a is provided with a suitable inlet channel 2 and an outlet channel 3 which are formed by a blower casing 9 and which are separated by a stationary partition 4 disposed exteriorly of rotor 1. Disposed within the interior of rotor 1 is a vortex generating and stabilizing device 6a comprising vortex guiding body 6 equipped with a member 7. Formed between guiding body 6 and member 7 is a slot 11 in which a low pressure area is established.

Stabilizing device 6a together with guide body 6 is described in detail in my previously mentioned copending application to which reference is made in the event a more detailed disclosure is required for a complete understanding of the present invention.

With continuing reference to FIGURE 1, a covering member 8 disposed within the interior of rotor 1 is positioned radially between guiding body 6 and the blades of rotor 1 in a region adjacent to partition 4 in the manner shown. Covering member 8 may be formed from a suitable plate and is preferably provided with oppositely directed concave and convex surfaces 8a and 8b which respectively face inwardly towards the outwardly directed convex surface of guide body 6 in radially spaced relation thereto and outwardly towards the inwardly directed periphery of the rotor blades. The radius of curvature of surfaces 8a and 8b substantially coincide with rotor axis 5 with member 8 extending in essentially parallel relation to rotor axis 5. Preferably, member 8 and body 6 extend the full axial length of rotor 1 with their surfaces in substantially concentric relationship to rotor axis 5.

As shown, covering member 8 is positioned in the close proximately to the inwardly directed bladed periphery of rotor 1 and is nearer to the rotor blades than to guide body 6 at a region which is substantially redially opposite from the inwardly directed end of partition 4.

Thus, with the foregoing structure, it is clear that covering member 8 is directed essentially between guide body 6 and partition 4 with the blades of rotor 1 passing between partition 4 and member 8.

In operation of blower 1a, device 6a forms and stabilizes a vortex within the interior of rotor 1 with the core of the vortex being guided by guide body 6 to maintain the vortex properly positioned within rotor 1. As the vortex turns, the outer portion of the vortex extending radially beyond the vortex core passes between guide body 6 and covering member 8. In this manner, the vortex will be protected against destruction and undesirable disturbance by the nearby passing blade screen of rotor 1. As a result, no appreciable energy input is required for repeatedly regenerating the vortex thus eliminating expenditure of energy for this purpose.

Due to the presence of covering member 8, larger vortices may be generated and maintained without harmful disturbance from movement of rotor 1. As a consequence of generating larger vortices, the spacing of the blower casing 9 may be increased from the periphery of rotor 1, thus providing a larger inlet opening and increased delivery efficiency.

Guiding body 6 as well as covering member 8 may be adapted to be adjustable in their position; they may also be different in shape. This enables the blower to be satisfactorily adapted to different working conditions. The adjustment of guide body 6 and member 8 may be accomplished in any suitable manner. For example, covering member 8 and/or guiding body 6 individually or together may be provided upon a mounting pivotable around the axis 5 of blower rotor 1.

FIGURE 2 illustrates another embodiment of the present invention, in which like parts are indicated by the same reference characters as in FIGURE 1.

As shown in FIGURE 2, a covering member 10 is arranged radially inwardly of the blades of the blower rotor 1 and spaced radially outwardly from a stabilizing device 16a having a guide body 16. The stabilizing device 16a includes a member 17 extending parallel to the guide body 16 in spaced relation therewith to form a slot 111 therebetween in which a low pressure area is established. The covering member 10 is formed with a circular or elliptical cross-sectional area and extends preferably the full axial length of the rotor in spaced parallel relation to the stabilizing device 16a.

Depending upon the particular construction of the transverse flow type blower, the covering member may be formed with other suitable shapes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A transverse flow type blower comprising a peripherally bladed rotor, fluid guide means disposed within the interior of said rotor for generating and stabilizing a fluid vortex wholly within the rotor, and means disposed radially between the blades of said rotor and said fluid guide means for protecting said vortex against disturbance by said rotor.

2. A transverse flow type blower comprising a casing providing an inlet channel and an outlet channel, a peripherally bladed rotor mounted for rotation in said casing, partition means positioned exteriorly of said rotor and separating said inlet channel from said outlet to confine fluid entering from said inlet channel to flow through the blades of said rotor, fluid guide means disposed within the interior of said rotor and being operable upon rotation of said rotor to generate and stabilize a fluid vortex wholly within said rotor, and a covering member disposed radially between said fluid guide means and the blades of said rotor in a region adjacent and substantially radially opposite said partition, said covering member being nearer to the blades of said rotor than to said fluid guide means to delimit a space with said fluid guide means through which the outer portion of said vortex turns to enable said member to protect said vortex against destructive disturbance by said rotor.

3. The transverse flow type blower defined in claim 2 wherein said covering member is provided with oppositely facing outwardly and inwardly directed convex and concave surfaces.

4. The transverse flow type blower defined in claim 2, said fluid guide means and said covering member extending substantially the full axial length of said rotor in parallel relationship to the rotational axis of said rotor.

5. A transverse flow type blower according to claim 1 wherein said fluid guide means includes means for producing a low pressure area on the side of said guide means facing the center of said rotor thereby holding and stabilizing the center of the generated vortex in its desired position.

6. A transverse flow type blower according to claim 4 wherein said fluid guide means includes means for producing a low pressure area on the side of said guide means facing the center of said rotor thereby holding and stabilizing the center of the generated vortex in its desired position.

References Cited in the file of this patent

UNITED STATES PATENTS

| 2,658,700 | Howell | Nov. 10, 1953 |
| 2,942,773 | Eck | June 28, 1960 |

FOREIGN PATENTS

| 225,767 | Australia | Dec. 4, 1959 |
| 581,241 | Italy | Aug. 23, 1958 |
| 876,612 | Great Britain | Sept. 6, 1961 |
| 876,617 | Great Britain | Sept. 6, 1961 |
| 886,377 | Great Britain | Jan. 3, 1962 |